D. KOPS.
HOSE SUPPORTER FOR APPAREL CORSETS.
APPLICATION FILED AUG. 11, 1911.
1,042,125.
Patented Oct. 22, 1912.
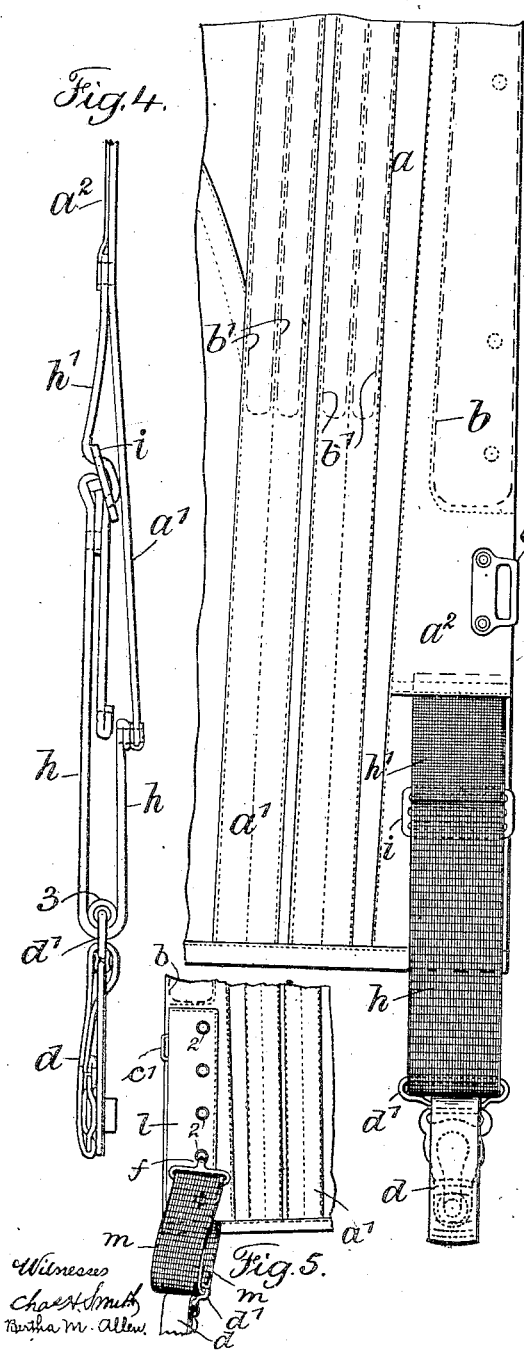
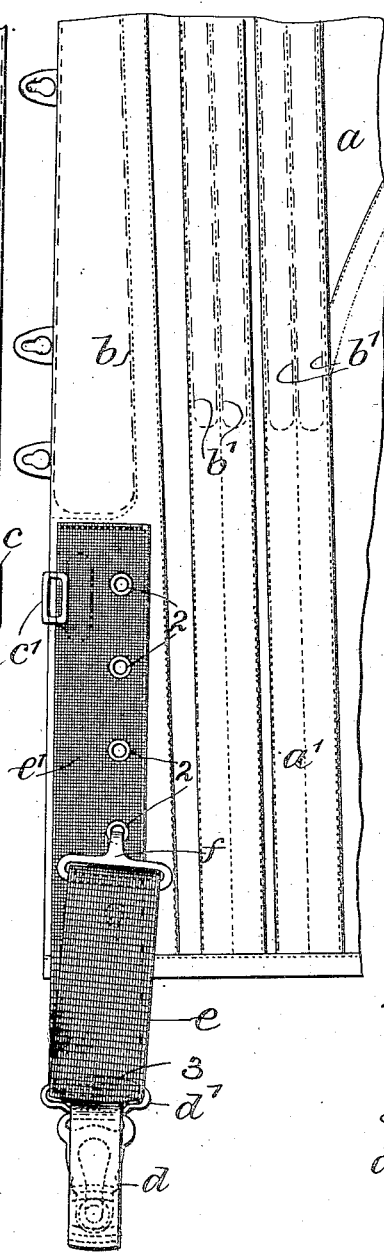
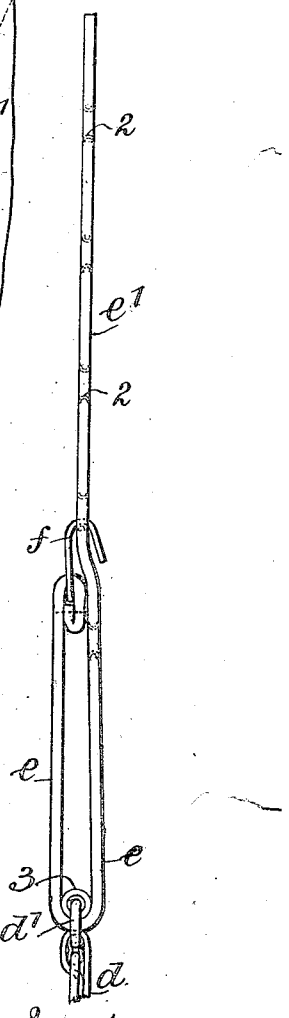
Inventor
Daniel Kops
by Harold Serrell
his atty

UNITED STATES PATENT OFFICE.

DANIEL KOPS, OF NEW YORK, N. Y.

HOSE-SUPPORTER FOR APPAREL-CORSETS.

1,042,125.  Specification of Letters Patent.  Patented Oct. 22, 1912.

Application filed August 11, 1911. Serial No. 643,481.

*To all whom it may concern:*

Be it known that I, DANIEL KOPS, a citizen of the United States, residing at the borough of Manhattan, in the city, county, and State of New York, have invented an Improvement in Hose-Supporters for Apparel-Corsets, of which the following is a specification.

My invention relates to an adjustable hose supporter adapted to be applied to an apparel corset, and which device may, by the wearer, be lengthened or shortened to meet the upper end of the hose for attachment thereto, under the desired tension.

The prevailing style of corset is provided with a long skirt below the front steels and the stays, and with the prevailing long hose it often happens that the upper end of the hose and the lower edge of the corset skirt come into such close relation that the usual hose supporters, attached to a corset, are so long that it is quite impossible to connect them with the hose and establish the desired tension or any tension at all, as it is substantially impossible to regulate their length to such extent, and thus the hose supporter function is entirely prevented.

In carrying out my invention, I preferably employ for my improved hose supporter, an elastic webbing, an inelastic part, a supporter clasp for the hose on a runner, and a device near the end of the elastic webbing for adjustable connection with the inelastic part which is to be secured to or form a substantial part of the corset.

In the preferred form of my invention, the elastic and inelastic parts are of webbing and integral, and a series of spaced eyelets are placed in the inelastic parts. This latter is sewed to the skirt of the corset at the front and upon the under side from the lower end of the steel down the skirt. The end of the elastic part is provided with an adjusting device, preferably a hook, and the webbing passes through the loop of the runner connected with the hose supporter clasp. The hook is adapted for connection with any one of the eyelets in establishing the adjusted position of the hose supporter to engage the hose and produce the tension desired.

In the drawing Figure 1 is an elevation at the lower front portion of a corset from the inside, showing the preferred form of my improved hose supporter, and Fig. 2, in larger size, is an edgewise view of the said hose supporter. Fig. 3 is an elevation at the lower front portion of the corset, also from the inside like Fig. 1, but the reverse side of the corset, showing a modification of the hose supporter of my invention, and Fig. 4, in larger size, is an edgewise view of the said hose supporter and the edge of the corset secured. Fig. 5 is an elevation at the lower front portion of a corset from the inside showing a further form of my invention.

Similar letters and numerals of reference in the several figures indicate the same parts.

The parts of the corset proper at the front are shown at $a$ $a$, and the prolongations or skirts at $a^1$ $a^1$.

$b$ represents the front steels in dotted lines and $b^1$ a part of the boning of a corset, also in dotted lines.

$c$ $c^1$ represents the parts of the fastening device of the skirts below the steels.

$d$ represents the supporter clasps which are of usual and well-known character, and $d^1$ the loop of the supporter clasps through which the elastic part $e$ of the webbing passes, and I prefer, in connection with this loop $d^1$, to employ a roller 3 for the runner, whereby the elastic webbing is easily drawn through the loop $d^1$ and the adjustment is a rolling rather than a sliding action, although it will be understood that I may dispense with this roller 3.

$e^1$, of Figs. 1 and 2, is the inelastic part of the webbing, which is preferably formed integral with the elastic part, and on the free end of the elastic part $e$, a hook $f$ is secured. The inelastic part is provided with a series of eyelets 2, substantially spaced apart and placed in the inelastic part, preferably near the inner edge, that is, the edge distant from the central skirt edge of the corset. The inelastic part is sewed to the skirt, preferably across the top and along the inner edge, and the upper end of the inelastic part is placed just below the front steels $b$, consequently, it is attached in its length to the skirt.

The hook $f$ is adapted to engage any one of the eyelets 2 in adjusting the length of the hose supporter, according to the position of the hose and the reach that is required from the lower edge of the skirt to the hose.

Between the inelastic part $e$ and the skirt $a^1$ of the corset, there is produced a form of pocket to receive the point of the hook so that the outer clothing may not accidentally engage the point of the hook and unhook the supporter, and further, so that the hook, even if not unhooked, is out of the way where the point cannot injure outer clothing.

I do not limit my invention, in any respect, by the length of the inelastic portion $e^1$ or by the length of the elastic portion $e$, or by the number of eyelets or the exact location of the same in the inelastic part.

In the form of my invention, shown in Figs. 3 and 4, $h$ represents the elastic part of the webbing, and $h^1$ the inelastic part, and particularly from the side elevation, Fig. 4 it will be noticed that the elastic part $h$ is secured at one end to the lower edge of the skirt $a^1$, that the elastic part passes through the loop $d^1$ of the supporter clasp, and at its upper end is secured to a slip buckle $i$. The inelastic part is secured to the skirt and an overlying strip of fabric $a^2$ at about the center of the skirt, or, in other words, about midway between the lower end of the steel $b$ and the lower edge of the skirt, and this inelastic part passes through the two slots of the slip buckle $i$ over the center bar, and the inelastic part is held by friction of its tortuous passage through the buckle. The adjustment for length, in this form of my invention, is effected entirely at the buckle by drawing up on the inelastic part or by lengthening out on the same. In this form of my invention I do not limit myself to the elastic and inelastic parts of any particular length, nor to the exact place of attachment of said elastic and inelastic parts.

The device of my invention, either as shown in Figs. 1 and 2, or as shown in Figs. 3 and 4, is adapted for use at other parts of the corset than directly at the front, and the same may also be sold as articles of merchandise prepared to be connected to a corset by the wearer.

In the form of my invention shown in Fig. 5, the skirt at the front edge from the lower edge of the steel to the lower edge of the skirt is preferably strengthened by a strip $l$ and the eyelets 2 are placed in this strip or even through this strip and the overlying skirt. The elastic webbing $m$ is secured at one end to the lower edge of the skirt and lower end of the strip $l$ and the opposite end of the elastic webbing is provided with a hook as $f$. A supporter clasp $d$, as hereinbefore shown, is threaded by its loop $d^1$ and runner on the elastic webbing $m$ and the adjustment is effected as hereinbefore described with reference to Figs. 1 and 2. In this form of my invention I do not limit myself to the length of the eyelet strip, the number of the eyelets or the length of the elastic webbing, or particularly to the character of the hook $f$ or other engaging device. It will also be understood that I may dispense with the strip $l$ and place the eyelets 2 in a lower portion of the skirt of the corset, without departing from the nature and spirit of my invention.

I claim as my invention:

1. The combination with a corset having a skirt, of an elastic webbing secured to the lower edge of the skirt and returned on itself forming a loop, a hose supporter fastening having a loop through which the webbing slidingly passes, an inelastic webbing secured to the corset in a plane higher than the fastening of the elastic part, and a fastening device carried by the free end of the elastic part and adapted for adjustable connection with said inelastic member, the strain of said connection being borne by the inelastic member.

2. A hose supporter for apparel corsets, comprising a webbing having an inelastic part adapted to be secured to the corset, and an elastic part adapted for tension, the latter being a substantial prolongation of the other and supported thereby, a supporter clasp having a loop through which the elastic part passes for running movement, and a device near the end of the elastic part for adjustable connection with the inelastic part.

3. A hose supporter for apparel corsets, comprising a webbing having integral inelastic and elastic parts, the inelastic part adapted to be secured to the under side of the corset, and the elastic part adapted for tension in a plane below the inelastic part, a supporter clasp having a loop through which the elastic part passes, a hook device near the end of the elastic part, and eyelets in the inelastic part for adjustable connection with the said device.

Signed by me this 7th day of August, 1911.

DANIEL KOPS.

Witnesses:
GEO. T. PINCKNEY,
MARY E. LELAND.